(12) United States Patent
Corma Canós et al.

(10) Patent No.: US 6,849,248 B2
(45) Date of Patent: Feb. 1, 2005

(54) POROUS CRYSTALLINE MATERIAL (ZEOLITE ITQ-21), THE PREPARATION METHOD THEREOF AND USE OF SAME IN THE CATALYTIC CONVERSION OF ORGANIC COMPOUNDS

(75) Inventors: Avelino Corma Canós, Valencia (ES); Fernando Rey García, Valencia (ES); María José Díaz Cabañas, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 0 days.

(21) Appl. No.: 10/714,571

(22) Filed: Nov. 14, 2003

(65) Prior Publication Data

US 2004/0149964 A1 Aug. 5, 2004

Related U.S. Application Data

(63) Continuation of application No. PCT/ES02/00223, filed on May 10, 2002.

(30) Foreign Application Priority Data

May 14, 2001 (ES) .......................................... 200101145

(51) Int. Cl.[7] .......................... C01B 39/48; B01J 29/70
(52) U.S. Cl. ...................... 423/718; 423/706; 423/708; 423/713; 502/60; 208/46
(58) Field of Search ................................. 423/718, 706, 423/708, 329.1, 713, 326; 208/46; 502/60, 62

(56) References Cited

U.S. PATENT DOCUMENTS

| | | | | |
|---|---|---|---|---|
| 3,411,874 A | * | 11/1968 | Ciric | .......................... 423/709 |
| 5,393,511 A | * | 2/1995 | Delprato et al. | ............ 423/718 |
| 6,080,382 A | * | 6/2000 | Lee et al. | .................... 423/706 |

FOREIGN PATENT DOCUMENTS

EP     0 337 479 B1     7/1992

* cited by examiner

*Primary Examiner*—David Sample
(74) *Attorney, Agent, or Firm*—Klauber & Jackson

(57) ABSTRACT

A porous crystalline material (ITQ-21) which in its calcined form has the chemical composition $$X_2O_3:nYO_2:mZO_2$$

Figure 1:
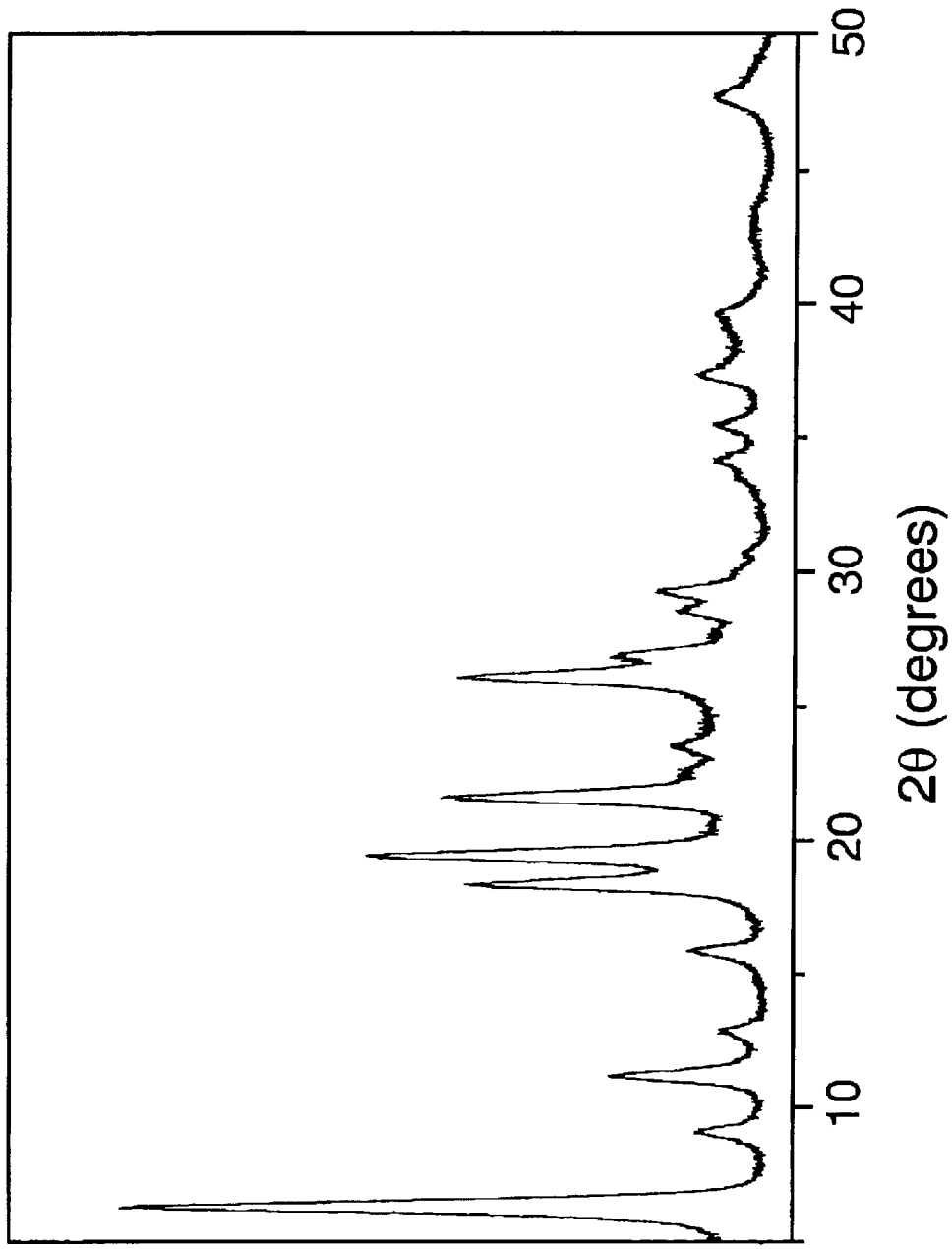

wherein (n+m) is at least 5, X is a trivalent element, Z is Ge, Y is at least one tetravalent element other than Ge, and the ratio is m/(n+m) is 0.0 to 0.5, and displays the X-ray diffraction values given in Table 1, and a method of preparation of the material in the presence of fluoride ions and using N(16)-methylsparteinium as structure director agent; the material being useful in its acid form and in bifunctional catalyst form in processes of catalytic cracking, hydrocracking and alkylation of aromatics.

13 Claims, 1 Drawing Sheet

POROUS CRYSTALLINE MATERIAL (ZEOLITE ITQ-21), THE PREPARATION METHOD THEREOF AND USE OF SAME IN THE CATALYTIC CONVERSION OF ORGANIC COMPOUNDS

RELATED APPLICATIONS

The present application is a Continuation of co-pending PCT Application No. PCT/ES02/00223, filed May 10, 2002, which in turn, claims priority from Spanish Application Serial No. 200101145, filed May 14, 2001. Applicants claim the benefits of 35 U.S.C. §120 as to the PCT application and priority under 35 U.S.C. §119 as to said Spanish application, and the entire disclosures of both applications are incorporated herein by reference in their entireties.

FIELD OF THE TECHNIQUE OF THE INVENTION

The present invention belongs to the technical field of porous materials, and particularly to porous materials of a zeolitic nature useful in the catalytic conversion of organic compounds.

STATE OF THE ART PRIOR TO THE INVENTION

Zeolites are porous crystalline aluminosilicates that have found important applications as catalysts, adsorbents and ion exchangers. Many of these zeolitic materials have well-defined structures forming channels and cavities in their interior of uniform size and shape, permitting the adsorption of certain molecules while preventing the passage to the interior of the crystal of other molecules of a size too large to disperse through the pores. This characteristic confers molecular sieve properties on these materials. The lattice of these molecular sieves can include Si and other elements from group IIIA of the periodic table, all of them tetrahedrically coordinated, with the tetrahedra being joined via their vertices by means of oxygens in order to form a three-dimensional lattice. The negative charge generated by group IIIA elements tetrahedrically coordinated in lattice positions is compensated by the presence of cations in the crystal, such as for example alkalies or alkaline-earths. One type of cation can be wholly or partially exchanged for another type of cation by means of ion exchange techniques, thereby being able to vary the properties of a given silicate by selecting the desired cations.

Many zeolites have been synthesised in the presence of an organic molecule which acts as the structure director agent. Organic molecules acting as structure director agents (SDA) generally contain nitrogen in their composition and can give rise to stable organic cations in the reaction medium.

The mobilisation of the silica can be done in the presence of OH⁻ groups and basic medium, which can be introduced as a hydroxide of the SDA itself, such as for example tetrapropylammonium hydroxide in the case of ZSM-5 zeolite. Fluoride ions can also act as mobilising agents of the silica in the synthesis of zeolites, as, for example, in patent EP-A-0337479 which describes the use of HF in $H_2O$ at low pH as a mobilising agents of the silica for the synthesis of ZSM-5.

Around 135 different zeolitic structure have been currently described. Nevertheless, only one of them possesses a structure characterised by containing cavities of relatively large volume in its structure, which are accessible through channels with a cross-section corresponding to that formed from 12 silica tetrahedra. This zeolite, known as Faujasite, is the one generally used as a catalyst in catalytic cracking processes. Yet, this material cannot be synthesised with a low aluminium content, which means that it has to be subjected to post-synthesis processes of dealuminisation.

So, it would be highly desirable to have a zeolitic material with low Al content and with a topology such that it displays cavities with high volume accessible via channels shaped by 12-tetrahedra rings, and which can be obtained directly in a single synthesis step.

DESCRIPTION OF THE INVENTION

The present invention refers to a new porous crystalline material (hereinafter also identified as ITQ-21) which has a molar composition in its calcined anhydrous state given by the equation $$X_2O_3 : nYO_2 : mZO_2$$

wherein X is a trivalent element such as Al, B, Fe, In, Ga, Cr or mixtures of them, Y is a tetravalent element such as Si, Ti, Sn or mixtures or them, though Si is preferred, and Z is Ge, the value of (n+m) is at least 5, and can be between 7 and ∞, the value of m/(n+m) is between 0.0 and 0.5.

From the given values, it is clearly deduced that the crystalline material ITQ-21 can be synthesised in the absence of added trivalent elements.

The material ITQ-21 also has, both in its calcined form and synthesised without being calcined, an X-ray diffraction pattern that is different from that of other known zeolitic materials, and whose most important diffraction lines are given in table 1 for the calcined form and in table 2 for the uncalcined form.

TABLE 1

| d(±0.3 Å) | Relative Intensity |
|---|---|
| 13.64 | vs |
| 7.87 | vs |
| 4.82 | w |
| 4.55 | m |
| 4.11 | m |
| 3.41 | m |

TABLE 2

| d(±0.3 Å) | Relative Intensity |
|---|---|
| 13.77 | mf |
| 7.96 | m |
| 4.88 | m |
| 4.60 | s |
| 4.16 | m |
| 3.45 | s |

In an embodiment of the invention, the material ITQ-21 can in addition have the diffraction lines specified in tables 1A (for the calcined form) and 2A (for the uncalcined form):

TABLE 1A

| d(±0.3 Å) | Relative Intensity |
|---|---|
| 9.64 | vw |
| 6.82 | vw |
| 3.78 | vw |
| 3.31 | vw |
| 3.13 | vw |
| 3.05 | vw |
| 2.91 | vw |
| 2.67 | vw |
| 2.62 | vw |
| 2.53 | v |
| 2.41 | vw |

TABLE 2A

| d(±0.3 Å) | Relative Intensity |
|---|---|
| 9.76 | w |
| 6.90 | vw |
| 5.63 | vw |
| 3.98 | vw |
| 3.82 | vw |
| 3.34 | w |
| 3.25 | vw |
| 3.16 | vw |
| 3.08 | w |
| 2.65 | w |
| 2.56 | w |
| 2.44 | w |
| 2.40 | vw |
| 2.33 | vw |

These diffractograms were obtained with a Philips X Pert diffractometer equipped with a graphite monochromator and an automatic divergence slit using $K_\alpha$ radiation from copper. The diffraction data was recorded by means of a 2θ pass of 0.01° wherein θ is the Bragg angle and a count time of 10 seconds per pass. The interplanar spaces d were calculated in Ångstrom and the relative intensity of the lines is calculated as a percentage with respect to the most intense peak, and is considered very strong (vs)=80–100, strong (s)=60–80, medium (m)=40–60, weak (w)=20–40 or very weak (vw)=0–20.

It must be borne in mind that the diffraction data listed for this sample as single or sole lines can be composed of superposed overlaps, or of superposition of reflections which, under certain conditions, such as differences in crystallographic changes, can appear as resolved or partially resolved lines. In general, crystallographic changes can include small variations in the parameters of the unit cell and/or changes in the symmetry of the crystal, without any change occurring in the connectivity between the atoms of the structure. These modifications, which also include changes in relative intensities, can also be due to differences in the type and quantity of compensation cations, lattice composition, crystal size and shape of them, preferred orientation or to the type of thermal or hydrothermal treatment undergone.

In the synthesis process of ITQ-21, use can be made of fluorides, more specifically HF as mobilising agent of the silica and the germanium oxide, with organic molecules and fluoride ions being occluded in the interior of the structure and which can be eliminated by conventional means. So, the organic component can be eliminated by, for example, extraction or by thermal treatment by heating to a temperature above 250° C. for a period of time between 2 minutes and 25 hours.

The compensation cations in the material in its uncalcined form, or following thermal treatment, can be exchanged by other cations, if present, such as metal ions, $H^+$ and precursors of $H^+$ such as $NH_4^+$. Among the cations that can be introduced by ion exchange, those which can have a positive role in the activity of the material as a catalyst are preferred, and more specifically preference is given to cations such as $H^+$, cations of rare earths and group VIII metals, as well as those of group IIA, IIIA, IVA, VA, IB, IIB, IIIB, IVB, VB, VIIB of the periodic table of elements.

In order to prepare catalysts, the crystalline material of the present invention can be intimately combined with hydrogenating-deoxidising components such as platinum, palladium, nickel, rhenium, cobalt, tungsten, molybdenum, vanadium, chromium, manganese, iron. The introduction of these elements can be carried out in the crystallisation stage, by exchange (if appropriate), and/or by impregnation or by physical mixing. These elements can be introduced in their cationic form and/or starting from salts or other compounds, which decompose to generate the metallic component or oxide in its appropriate catalytic form.

The crystalline material ITQ-21 can be prepared starting from a reaction mixture containing $H_2O$ and, optionally an oxide or a source of the trivalent element X, such as for example Al and/or B, an oxide or a source of the tetravalent element or elements Y, such as for example Si; a source of Ge, Z, such as for example $GeO_2$, an organic structure director agent (R), generally a salt of N(16)-methylsparteinium, preferably the hydroxide, and a source of fluoride ions, preferably HF.

The composition of the reaction mixture is as follows in terms of molar ratios of oxides:

| | Molar ratio | |
|---|---|---|
| Reagents | Useful | Preferred |
| $(YO_2 + ZO_2)/(X_2O_3)$ | greater than 5 | greater than 7 |
| $H_2O/(YO_2 + ZO_2)$ | 1–50 | 2–20 |
| $R/(YO_2 + ZO_2)$ | 0.1–3.0 | 0.1–1.0 |
| $F/(YO_2 + ZO_2)$ | 0.1–3.0 | 0.1–1.0 |
| $ZO_2/(YO_2 + ZO_2)$ | 0.0–0.5 | 0.0–0.17 |

The crystallisation of ITQ-21 can be carried out statically or with stirring, in autoclaves at a temperature between 80 and 200° C., and with sufficient time for achieving crystallisation, for example between 12 hours and 30 days.

It must be borne in mind that the components of the synthesis mixture can come from different sources and, depending on these, the crystallisation times and conditions can vary. In order to facilitate the synthesis, crystals of ITQ-21 can be added to the synthesis mixture as seeds, in amounts up to 15% by weight with respect to the total weight of oxides. They can be added previously or during the crystallisation of ITQ-21.

On completion of the crystallisation stage, the crystals of ITQ-21 are separated from the mother water and are recovered.

The material produced by means of this invention can be pelletised in accordance with known techniques, and can be used as a component of catalysts for catalytic cracking of hydrocarbons, catalytic hydro-cracking of hydrocarbons, alkylation of aromatics with olefins and in processes of esterification, acylation, aniline reaction with formaldehyde in its acidic form and/or exchanged with appropriate cations.

EXAMPLES

In order to contribute towards the understanding of the invention, described below are some examples forming an integral part of this specification.

Example 1
Preparation of N(16)-Methylsparteinium Hydroxide 20.25 g of (−)-sparteine are mixed with 100 ml of acetone. To this mixture are added 17.58 g of methyl iodide, drop by drop, while the mixture is stirred. After 24 hours, a cream-coloured precipitate appears. 200 ml of diethyl ether are added to the reaction mixture, it is filtered and the solid obtained is vacuum dried. the product is N(16)-methylsparteinium iodide with a yield greater than 95%.

The iodide is exchanged for hydroxide by using ion exchange resin, according to the following procedure: 31.50 g of N(16)-methylsparteinium iodide are dissolved in 92.38 g of water. To the solution that is obtained, 85 g of Dowes BR resin are added and stirring is maintained until the following day. It is then filtered, washed with distilled water and we obtain 124.36 g of N(16)-methylsparteinium hydroxide solution with a concentration of 0.65 mol/kg.

Example 2

0.32 g of $GeO_2$ are dissolved in 11.25 g of N(16)-methylsparteinium hydroxide solution with a concentration of 1.48 mol/kg. In the solution obtained, 6.30 g of tetra-ethylorthosilicate are hydrolysed and stirring is maintained allowing all the ethanol formed in the hydrolysis to evaporate. 0.69 g are then added of a hydrofluoric acid solution (48.1% of HF by weight) and evaporation is continued until the reaction mixture achieves a final composition:

$0.91SiO_2:0.09\ GeO_2:0.50ROH:0.50HF:3H_2O$ wherein ROH is N(16)-methylsparteinium hydroxide.

The gel is heated at 175° C. whilst stirring for 48 hours in a steel autoclave with an internal Teflon lining. The solid obtained after filtering, washing with distilled water, and drying at 100° C. is ITQ-21, the list of diffraction peaks for which is included in table 3.

The material is calcined at 540° C. for 3 hours in an airflow in order to eliminate organic matter and the fluoride ions occluded in its interior. The powder X-ray diffraction pattern of the solid obtained coincides with the values of table 1 and is shown in FIG. 1, the list of diffraction peaks for which is included in table 4.

TABLE 3

| d(±0.3 Å) | Relative Intensity |
|---|---|
| 13.77 | vs |
| 9.76 | w |
| 7.96 | m |
| 6.90 | vw |
| 5.63 | vw |
| 4.88 | m |
| 4.60 | s |
| 4.16 | m |
| 3.98 | vw |
| 3.82 | vw |
| 3.45 | s |
| 3.34 | w |
| 3.25 | vw |
| 3.16 | vw |
| 3.08 | w |
| 2.65 | w |
| 2.56 | w |
| 2.44 | w |
| 2.40 | vw |
| 2.33 | vw |

TABLE 4

| d(±0.3 Å) | Relative Intensity |
|---|---|
| 13.64 | vs |
| 9.64 | vw |
| 7.87 | vs |
| 6.82 | vw |
| 4.82 | w |
| 4.55 | m |
| 4.11 | m |
| 3.78 | vw |
| 3.41 | m |
| 3.31 | vw |
| 3.13 | vw |
| 3.05 | vw |
| 2.91 | vw |
| 2.67 | vw |
| 2.62 | vw |
| 2.53 | vw |
| 2.41 | vw |

In these tables, the abbreviations vs, w, m, w and vw have the following meanings:

vs a very strong relative intensity of 80–100, s a strong relative intensity of 60–80, m a medium relative intensity of 40–60, w a weak relative intensity of 20–40 vw a very weak relative intensity of 0–20.

Example 3

0.23 g of $GeO_2$ are dissolved in 15.35 g of N(16)-methylsparteinium hydroxide solution with a concentration of 1.48 mols/kg. In the solution obtained, 9.01 g of tetra-ethylorthosilicate are hydrolysed and stirring is maintained allowing the ethanol formed to evaporate. 0.94 g are then added of a hydrofluoric acid solution (48.1% of HF by weight) and evaporation is continued until the mixture achieves a composition:

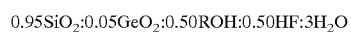

$0.95SiO_2:0.05GeO_2:0.50ROH:0.50HF:3H_2O$ wherein ROH is N(16)-methylsparteinium hydroxide.

The gel is heated for 12 days in steel autoclaves with an internal Teflon lining, at 175° C. with stirring. The solid obtained after filtering, washing with distilled water and drying at 100° C. is ITQ-21.

Example 4

6.67 g of tetraethylorthosilicate are hydrolysed in 11.43 g of N(16)-methylsparteinium hydroxide solution with a concentration of 1.40 mol/kg, with stirring being maintained and allowing all the ethanol formed in the hydrolysis to evaporate. 0.67 g of a hydrofluoric acid solution (48.1% of HF by weight) are then added and evaporation is continued until the reaction mixture achieves a final composition:

$SiO_2:0.50ROH:0.50HF:3H_2O$ wherein ROH is N(16)-methylsparteinium hydroxide.

After 14 days of crystallisation at 175° C. with stirring in autoclaves with an internal Teflon lining, a solid is obtained whose diffractogram coincides with that described for CIT-5 zeolite.

Example 5

0.21 g of aluminium isopropoxide and 0.24 g of $GeO_2$ are dissolved in 11.36 g of N(16)-methylsparteinium hydroxide solution with a concentration of 1.1 mol/kg. In the solution obtained, 4.74 g of tetraethylorthosilicate are hydrolysed and stirring is maintained allowing all the ethanol formed in the hydrolysis to evaporate. 0.52 g of a hydrofluoric acid solution (48.1% of HF by weight) are then added. The final composition of the synthesis gel is:

0.91SiO$_2$:0.09GeO$_2$:0.02Al$_2$O$_3$:0.50ROH:0.50HF:3H$_2$O wherein ROH is N(16)-methylsparteinium hydroxide.

The gel is heated at 175° C. with stirring for 5 days in steel autoclaves with an internal Teflon lining. The solid obtained after filtering, washing with distilled water and drying at 100° C., is Al-ITQ-21.

Example 6

0.16 g of GeO$_2$ and 0.26 g of aluminium isopropoxide are dissolved in 17.70 g of N(16)-methylsparteinium hydroxide solution with a concentration of 0.89 mols/kg. In the solution obtained, 6.25 g of tetraethylorthosilicate are hydrolysed and stirring is maintained allowing all the ethanol and water formed to evaporate, so that the desired composition can be achieved. 0.65 g of a hydrofluoric acid solution (48.1% of HF by weight) are then added. The final composition is as follows:

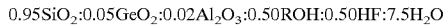
0.95SiO$_2$:0.05GeO$_2$:0.02Al$_2$O$_3$:0.50ROH:0.50HF:7.5H$_2$O wherein ROH is N(16)-methylsparteinium hydroxide.

The gel is heated at 150° C. with stirring in steel autoclaves with an internal Teflon lining. After 11 days, we obtain a solid with an X-ray diffractogram corresponding to that described for ITQ-21.

Example 7

0.73 g of GeO$_2$ are dissolved in 35.00 g of N(16)-methylsparteinium hydroxide solution with a concentration of 1.1 mol/kg. In the solution obtained, 14.58 g of tetraethylorthosilicate are hydrolysed and stirring is maintained allowing all the ethanol formed in the hydrolysis to evaporate, until the desired composition is achieved. 1.60 g of a hydrofluoric acid solution (48.1% of HF by weight) are then added so that the final composition is:

0.91SiO$_2$:0.09GeO$_2$:0.50ROH:0.50HF:7.5H$_2$O wherein ROH is N(16)-methylsparteinium hydroxide.

The gel is heated at 175° C. with stirring for 3 days in steel autoclaves with an internal Teflon lining. The solid obtained after filtering, washing with distilled water and drying at 100° C., is ITQ-21 with amorphous material

Example 8

The solid obtained after heating the synthesis gel of example 7 at 135° C. with stirring for 7 days is ITQ-21.

Example 9

0.31 g of GeO$_2$ are dissolved in 16.34 g of N(16)-methylsparteinium hydroxide solution with a concentration of 1.01 mols/kg. In the solution obtained, 6.25 g of tetraethylorthosilicate and 0.15 g of tetraethylorthotitanate are hydrolysed. 0.32 g of H$_2$O$_2$ (35% by weight) are added and stirring is maintained allowing all the ethanol and water formed to evaporate, so that the desired composition can be achieved. 0.65 g of a hydrofluoric acid solution (48.1% of HF by weight) are then added. The final composition is as follows:

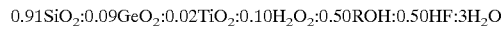
0.91SiO$_2$:0.09GeO$_2$:0.02TiO$_2$:0.10H$_2$O$_2$:0.50ROH:0.50HF:3H$_2$O wherein ROH is N(16)-methylsparteinium hydroxide.

The gel is subjected to heating at 175° C. with stirring for 3 days in steel autoclaves with an internal Teflon lining. After 4 days, we obtain Ti-ITQ-21.

What is claimed is:

1. A porous crystalline material with a chemical composition

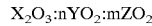
X$_2$O$_3$:nYO$_2$:mZO$_2$ wherein (n+m) is at least 5,

X is a trivalent element,

Z is Ge,

Y is at least one tetravalent element other than Ge, and the ratio of m/(n+m) is between 0.0 and 0.5 said material having, in its calcined form, an X-ray diffraction pattern whose most characteristic diffraction peaks appear at values substantially coincident with

| d(±0.3 Å) | Relative Intensity |
|---|---|
| 13.64 | vs |
| 7.87 | vs |
| 4.82 | w |
| 4.55 | m |
| 4.11 | m |
| 3.41 | m | wherein d are interplanar spaces d in Ångstrom and the relative intensity of the lines is calculated as a percentage with respect to the most intense peak, with vs being a very strong relative intensity of 80–100, m being a medium relative intensity of 40–60, and w being a weak relative intensity of 20–40.

2. A porous crystalline material in accordance with claim 1, which in its uncalcined synthesised form has an X-ray diffraction pattern whose most characteristic diffraction peaks are substantially coincident with

| d(±0.3 Å) | Relative Intensity |
|---|---|
| 13.77 | vs |
| 7.96 | m |
| 4.88 | m |
| 4.60 | s |
| 4.16 | m |
| 3.45 | s | wherein d are interplanar spaces d in Ångtrom and the relative intensity of the lines is calculated as a percentage with respect to the most intense peak, with vs being a very strong relative intensity of 80–100, s being a strong relative intensity of 60–80, and m being a medium relative intensity of 40–60.

3. A crystalline material in accordance with claim 1, characterised in that in its calcined state it also displays diffraction peaks substantially coincident with

| d(±0.3 Å) | Relative Intensity |
|---|---|
| 9.64 | vw |
| 6.82 | vw |
| 3.78 | vw |
| 3.31 | vw |
| 3.13 | vw |
| 3.05 | vw |
| 2.91 | vw |
| 2.67 | vw |
| 2.62 | vw |
| 2.53 | vw |
| 2.41 | vw | wherein vw is a very weak relative intensity of 0–20.

4. A crystalline material in accordance with claim 2, characterised in that in its uncalcined state it also displays diffraction peaks substantially coincident with

| d(±0.3 Å) | Relative Intensity |
|---|---|
| 9.76 | w |
| 6.90 | vw |
| 5.63 | vw |
| 3.98 | vw |
| 3.82 | vw |
| 3.34 | w |
| 3.25 | vw |
| 3.16 | vw |
| 3.08 | w |
| 2.65 | w |
| 2.56 | w |
| 2.44 | w |
| 2.40 | vw |
| 2.33 | vw | wherein w is a weak relative intensity of 20–40, and vw is a very weak relative intensity of 0–20.

5. A crystalline material in accordance with claim 1, wherein

X is at least one trivalent element selected from the group of Al, B, In, Ga, Fe; and Y is at least one tetravalent element selected from among Si, Sn, Ti, V.

6. A crystalline material in accordance with claim 1, wherein X is selected from among B, Al and combinations of them, and Y is Si.

7. A process for synthesising the crystalline material in accordance with claim 1, comprising:

a first stage of causing a synthesis mixture comprising a source of the trivalent element X, $H_2O$, an oxide or other source of the tetravalent material Y, an oxide or other source of the tetravalent material Z, an organic structure director agent (R), and a source of fluoride ions, and which has a composition, in terms of molar ratios of oxides, of:

| | |
|---|---|
| $(YO_2 + ZO_2)/X_2O_3 \geq$ | 5 |
| $H_2O/(YO_2 + ZO_2) =$ | 1 to 50 |
| $R/(YO_2 + ZO_2) =$ | 0.1 to 3.0 |
| $F/(YO_2 + ZO_2) =$ | 0.1 to 3.0 |
| $ZO_2/(YO_2 + ZO_2) =$ | 0.0 to 0.5 | to react, a second stage of maintaining the synthesis mixture under reaction conditions including temperature between 80 and 200° C., until crystals of said crystalline material are formed, a third stage of recovering said crystalline material.

8. A process in accordance with claim 7, comprising a fourth stage wherein organic matter and fluoride ions occluded in the interior of the crystalline material are eliminated by means of a treatment selected from among extraction treatments, thermal treatment at temperatures above 250° C. for a period of time between 2 minutes and 25 hours and combinations of them.

9. A process in accordance with claim 7, wherein the synthesis mixture has a composition, in terms of molar ratios, of

| | |
|---|---|
| $(YO_2 + ZO_2)/X_2O_3 \geq$ | 7 |
| $H_2O/(YO_2 + ZO_2) =$ | 2 to 20 |
| $R/(YO_2 + ZO_2) =$ | 0.1 to 1.0 |
| $F/(YO_2 + ZO_2) =$ | 0.1 to 1.0 |
| $ZO_2/(YO_2 + ZO_2)$ | 0.0–0.17. |

10. A process in accordance with claim 7, wherein the structure director agent is an N(16)-methylsparteinium salt.

11. A process in accordance with claim 7, wherein the structure director agent is N(16)-methylsparteinium hydroxide.

12. A method for converting a feed formed from at least one organic compound comprising placing the feed in contact with a catalytically active quantity of a crystalline material as claimed in claim 1.

13. A method for converting a feed formed from at least one organic compound comprising placing the feed in contact with a catalytically active quantity of a crystalline material obtained in accordance with the process claimed in claim 7.

* * * * *